United States Patent [19]

Dunlap et al.

[11] Patent Number: 5,556,152
[45] Date of Patent: Sep. 17, 1996

[54] TAILGATE

[76] Inventors: Charles L. Dunlap, deceased, late of Arlington, Tex.; by Lurlene D. Dunlap, legal representative, 6110 Pleasant Ridge Rd., Apartment 3398, Arlington, Tex. 76016

[21] Appl. No.: 526,389

[22] Filed: Sep. 11, 1995

[51] Int. Cl.$^6$ ................................................ B62D 33/03
[52] U.S. Cl. ..................................... 296/57.1; 296/180.1
[58] Field of Search ......................... 296/50, 57.1, 180.1

[56] References Cited

U.S. PATENT DOCUMENTS

| | | | |
|---|---|---|---|
| 783,172 | 2/1905 | Bolton | 296/57.1 |
| 1,764,615 | 3/1928 | Edwards. | |
| 2,054,122 | 8/1935 | Eisenberg, Jr. . | |
| 3,734,560 | 5/1973 | Cramblet . | |
| 4,063,772 | 12/1977 | Kincaid . | |
| 4,136,905 | 1/1979 | Morgan . | |
| 4,372,601 | 2/1983 | Smith | 296/50 |
| 4,475,759 | 10/1984 | Wine . | |
| 4,743,058 | 5/1988 | Fedrigo | 296/57.1 |
| 5,352,008 | 10/1994 | Denvir | 296/50 |
| 5,468,037 | 11/1995 | Peterson et al. | 296/57.1 |

*Primary Examiner*—Gary C. Hoge
*Attorney, Agent, or Firm*—James Creighton Wray

[57] ABSTRACT

A pickup truck tailgate is mounted in the opening at the rear of the pickup box on the truck between rear edge portions of the side wall. The rear edge portions have receivers at upper ends for receiving sliding bolts, and ramps extend forward and rearward from the receivers for pressing the bolts inward as the tailgate is raised from inside the truck box or from outside the truck. A first set of hinge pins extends inward from recesses near the bottom of the rear opening of the truck box, and a second set of hinge pins extends inward from recesses slightly above the first hinge pins. A first set of clasps in side edges of the tailgate near a bottom edge selectively engages and disengages the first set of hinge pins. A second set of clasps slightly above the first set of clasps selectively engages and disengages the second set of hinge pins. Receivers in the truck side walls adjacent the bed receive the latch pins when the tailgate is lowered to its inward position for holding the tailgate flush against the bed. A spoiler extends across an outer surface of the tailgate near the first and second set of clasps. A ledge on the truck body below the bed contacts the spoiler when the tailgate is lowered to its outward position.

4 Claims, 2 Drawing Sheets

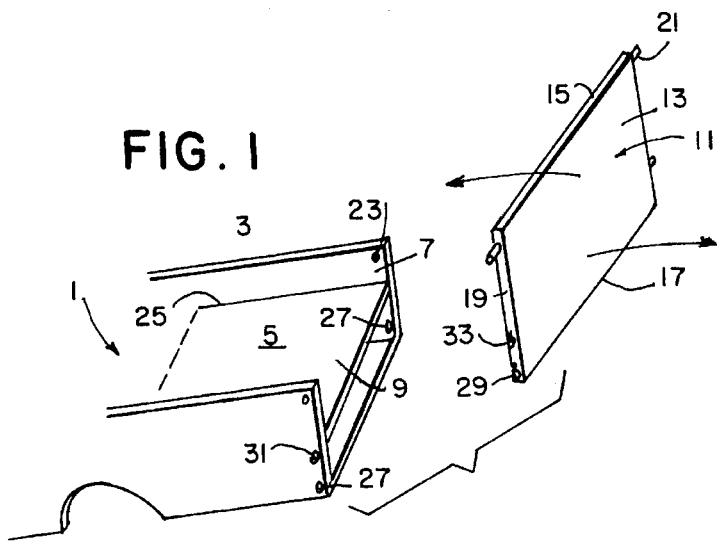
FIG. 1
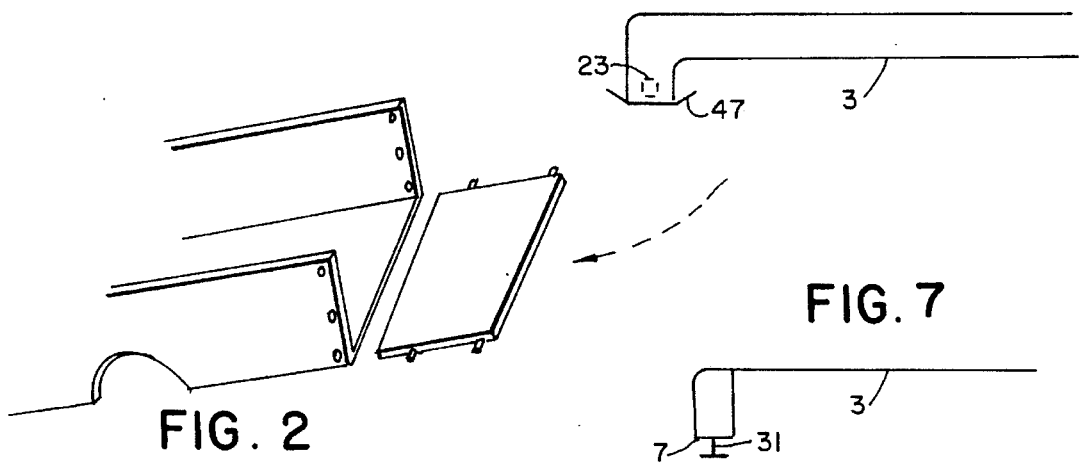
FIG. 2
FIG. 6
FIG. 7
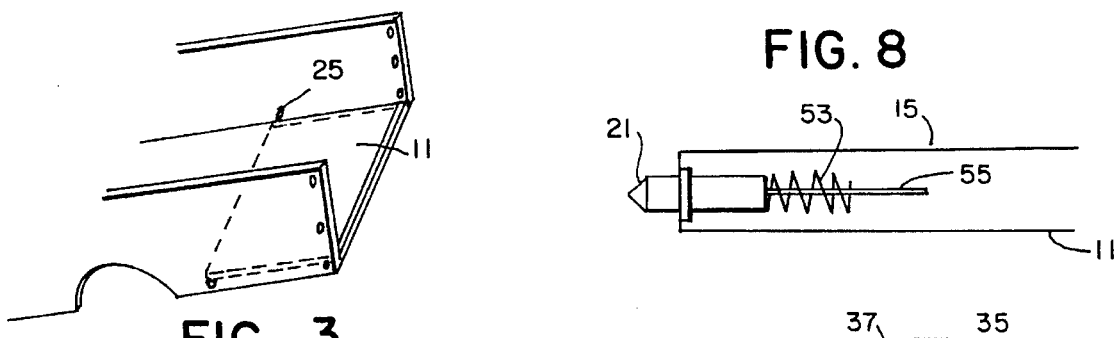
FIG. 3
FIG. 8
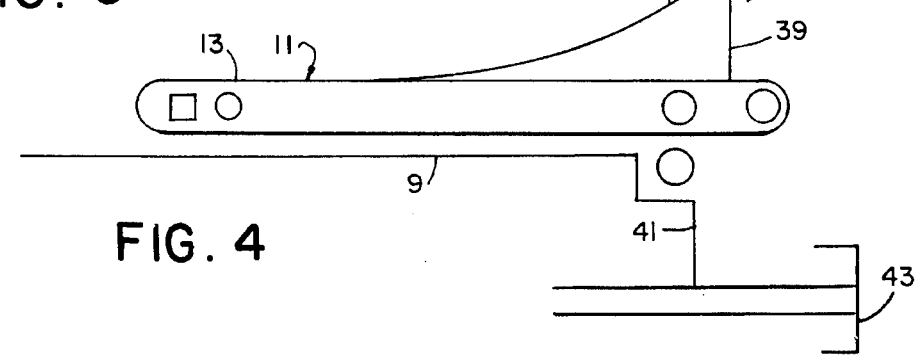
FIG. 4

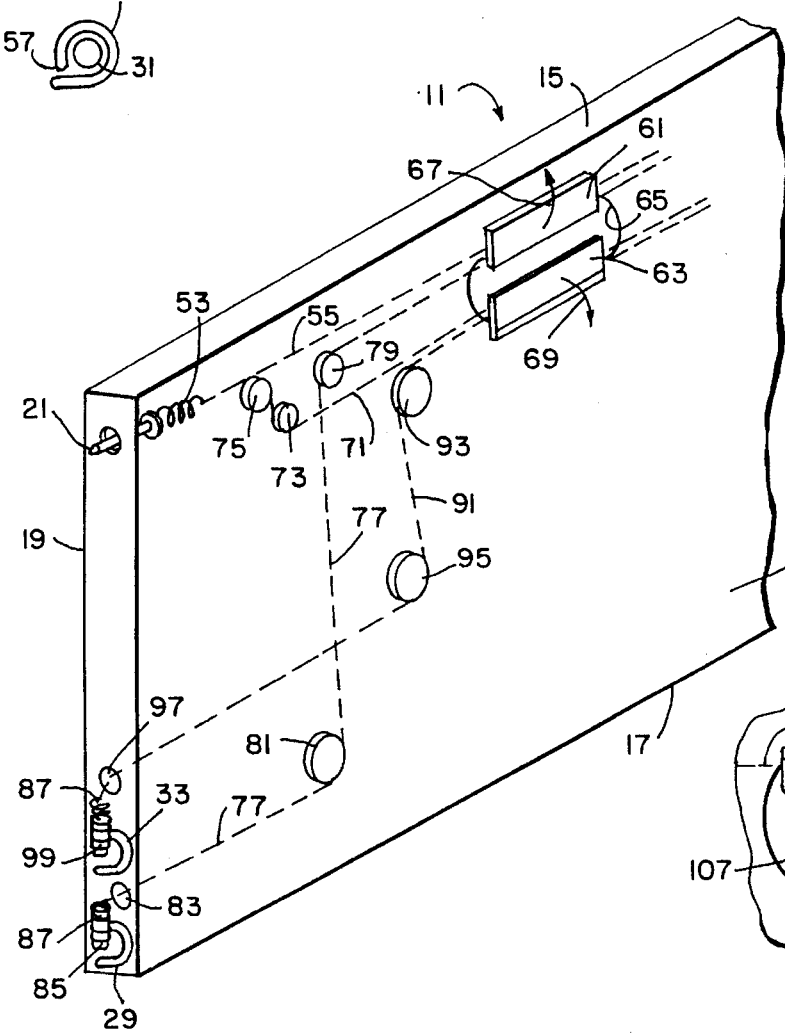

5,556,152

TAILGATE

SUMMARY OF THE INVENTION

The invention is an improved tailgate. The tailgate is kept in place by three sets of latches. Lower and upper latches are positioned on the lower and upper edges of the tailgate. Third latches engage the tailgate slightly above the bed. The upper and third sets of latches disengage to allow the tailgate to open outward, rearward and downward, flush with the bed. The lower and upper sets of latches disengage to allow the tailgate to open inward and to lie downward on the truck bed. A spoiler projects rearward from the closed tailgate and upward from the laid-forward tailgate.

The tailgate latching method shows the action of the gate's three functional positions. The uppermost latches are bolts. Two ramps cause the bolts to be pushed in by the strikes on the truck body when the gate is moved to the upright position from either horizontal position.

The four lower dual functioning latch-pivots engage headed posts that are fixed in the opening of the truck body. They do not move. They work this way; Hold out your left index finger horizontally and make a U with your right thumb and index finger. Now have the open U approach the left index finger with the open portion of the U facing the left index finger. As the finger enters the U, curl the right index finger down to meet the thumb, thereby encircling the left index finger. That is the action of the latching mechanism. If the latch is properly sized to the headed post, rotation can take place while retaining the post; this is the pivot action. Placing four of these in two pairs right and left at the bottom edge and just above the bottom edge of the tailgate creates two sets of pivots and latches. The operating handle on the gate selects which set is to be pivots and which set is to be latches for any given circumstance. The bolt is retracted regardless of the selection whenever the operating handle is operated.

This tailgate will improve the C.A.F.E. rating of the manufacturer who incorporates the gate into its product. C.A.F.E. stands for the Corporate Average Fuel Economy. The less fuel a given vehicle uses is to the auto makers' advantage. This benefit is also passed on to the consumer/owner. It will impact the market share, improve handling of unladen trucks, ease parking and keep the tailgate within the protection of the rear bumper. An insurance benefit should result from less insurance costs. It can be a sport feature for that type of buyer, and it can eliminate the after market purchases of aerodynamic tailgates.

The invention eliminates the need for after market purchase of fifth wheel types of tailgates.

The invention prevents the loss of the logo space when after market gates are installed. Now a tailgate has 10 square feet of area that display their logos. The display space is lost every time a tailgate is removed/replaced with after market purchased items. Multiplying that 10 square feet by the number of trucks made yearly probably exceeds the total billboard space rented by all manufacturers each year.

Even if the tailgate is consumer neutral, the manufacturer still will benefit from the positive elements of the tailgate.

The present tailgate has some very good benefits, among which are single handed operation. The new tailgate has only half the wetted are of a prior art tailgate, because the new tailgate has no edge effect drag because the edges are faired in by the metal that is raised in the bed on both sides of the tailgate which hold the hold-downs. Wetted area is that portion of an airfoil or hull that is subject to air or water flow. The more wetted surface area, the higher the drag. The present tailgate exposes only one surface to air flow. The bottom surface has a stagnant boundary layer. Therefore, no drag is added.

The new tailgate has less frontal area than a tipped gate. The new gate is more functional and less gimmicky than any known modified tailgate.

The invention has an advantageous support factor. Erect tailgates transfer the damaging impact loads from one side directly to the other, causing nearly twice the damage, which can be minimized by a folded gate. Support was a factor when rust was a factor. To loosen a post one applies force to wiggle it near the top. To loosen two posts one puts a rod between them and wiggles one.

In the improved tailgate the lower pivot needs to be near the center of the gate thickness to maintain the bed-to-gate height relationship when the tailgate is opened out. The operating parts are located on the gate. Bolts are withdrawn from gate engagement prior to pivoting the gate forward into the bed. The drawings show the portion of the truck bed just aft of the wheel housings. The lines represent the gate support cables. A tension reel, bungee, spring or gas springs as used in hatchback supports retract the cables as the gate is operated in either mode. The reason for this method of support instead of some other specific dimension support is because the geometry is not the same when the gate is down as it is when the gate is pivoted in. This method addresses that geometric difference. The cable stops support the gate loads when the gate is opened. The latch receivers in the bed are formed into the juncture of the truck bed and side wall. Ford, at least, already utilizes that same area for fuel filler accommodations. It could be reformed to provide for both functions. In a full sized F series pickup, the latches are similar to those used in the present invention for the two lower pair of latch/pivots and the area to be used for the bed latch receivers.

The improved tailgate will accomplish the following.

It improves fuel economy of vehicles when the fold-in feature is utilized. It improves the C.A.F.E. rating for the manufacturer who incorporates the new tailgate into their production.

It makes a styling statement and increases showroom traffic.

The new tailgate increases utility. The new tailgate never has to be removed or stored or replaced by an after market ventilated or notched top gate as used by some fifth wheel trailer operators.

The tailgate provides increased safety. It improves the stability of a truck if the tailgate is made with a spoiler along its lower edge to cause a down load on the rear axle when the vehicle is running empty at highway speeds. It improves the visibility to the rear at all times when the gate is down in the bed of the truck. Thus it improves parking ease.

The new tailgate reduces the possibility of damage to the gate and/or the truck body and other vehicles by not having the gate deployed beyond the protection of the rear bumper. Thus, the new gate produces insurance savings.

The spoiler area provides an area for the manufacturer's logo, which is lost when the standard tailgates are removed and replaced by an after market net type of gate or just plain removed.

The improved tailgate incorporates two sets of dual purpose pivot points (DPPP) arranged on the right and left sides of the gate. The lower pair is located at the lower edge of the gate, as is the current practice, and allows the gate to open outward in the conventional manner. The second pair of DPPP is located just above the previously described pair and is the pair used to hinge the improved tailgate into the truck bed.

The dual purpose feature is that both pairs also act as latching mechanisms. The upper pair disengages to allow the improved tailgate to pivot/hinge on the lower pair, permitting the improved tailgate to open outward and down in the conventional manner. The lower pair disengages to allow the improved tailgate to pivot/hinge on the upper pair when the improved tailgate is opened inward and down onto the truck bed.

The gate latching mechanism is a pair of sliding bolts in the upper edge of the gate, one on each side, as is a conventional practice. These latches secure the improved tailgate in the upright position and also secure the improved tailgate to the truck bed when opened inward.

The selection of how the improved tailgate is to operate is accomplished by a selective function in the improved tailgate latch handle mechanism. One function disengages the bolt latch and one pair of DPPP, allowing the improved tailgate to pivot on the engaged pair. The other function disengages the bolt latch and the other pair of DPPP, allowing the improved tailgate to pivot on the engaged pair. An interlock in the latch handle prevents the simultaneous release of all six mechanisms.

A pickup truck tailgate is mounted in the opening at the rear of the pickup box on the truck between rear edge portions of the side wall. The rear edge portions have receivers at upper ends for receiving sliding bolts, and ramps extend forward and rearward from the receivers for pressing the bolts inward as the tailgate is raised from inside the truck box or from outside the truck. A first set of hinge pins extends inward from recesses near the bottom of the rear opening of the truck box, and a second set of hinge pins extends inward from recesses slightly above the first hinge pins. A first set of clasps in side edges of the tailgate near a bottom edge selectively engages and disengages the first set of hinge pins. A second set of clasps slightly above the first set of clasps selectively engages and disengages the second set of hinge pins. Receivers in the truck side walls adjacent the bed receive the latch pins when the tailgate is lowered to its inward position for holding the tailgate flush against the bed. A spoiler extends across an outer surface of the tailgate near the first and second set of clasps. A ledge on the truck body below the bed contacts the spoiler when the tailgate is lowered to its outward position.

A preferred tailgate assembly apparatus includes a tailgate mount connected to the truck and a tailgate connected to the tailgate mount. The tailgate mount and the tailgate have a pair of latches mounted on the tailgate near an upper edge and mounted on the mount near the upper edge. A first pair of disconnectable hinges are mounted on the tailgate near a lower edge and are mounted on the mount near a lower end of the mount. A second pair of disconnectable hinges are mounted on the tailgate above the first pair of hinges and are mounted on the mount above the first pair of hinges and near a bed of a truck, for unlatching the first pair of latches and disengaging the first pair of hinges and rotating the tailgate inward in the mount against a bed of a truck, and for unlatching the pair of latches and disengaging the second pair of hinges and rotating the tailgate outward.

A preferred tailgate apparatus for a pickup truck has a bed with side walls and a front wall and a floor connected to the side walls and front walls. An opening at the rear of the side walls receives a tailgate. Receivers are located at the tops of the openings. First hinges are located at the bottoms of the openings near the floor and second hinges are connected to the openings above the first hinges and near the floor.

A preferred tailgate has inner and outer surfaces and a top edge. A bottom edge and side edges are positioned in the opening. Latch pins extensible from the tailgate sides are located near the top edge for engaging the receivers. A first pair of clasps extends from the side of the tailgate near the lower edge for selectively engaging and disengaging the first hinges. A second set of clasps is positioned on the sides of the tailgate above the first set for selectively engaging and disengaging the second hinges. A second set of receivers in the sides of the truck box above the floor receive the latch pins.

A spoiler extends outward from a rear surface of the tailgate.

A step in the body below the opening abuts the spoiler when the first set of clasps engage the first hinges and when the tailgate is lowered rearwardly.

These and further and other objects and features of the invention are apparent in the disclosure, which includes the above and ongoing written specification, with the claims and the drawings.

BRIEF DESCRIPTION OF THE DRAWINGS

FIG. 1 is a schematic detail of a rear end of a pickup truck box and a tailgate.

FIG. 2 shows the tailgate in its outward lowered position.

FIG. 3 shows the tailgate in its inward position flush with the bed of the pickup truck.

FIG. 4 shows a preferred form of the tailgate in its lowered position flush with the bed of the pickup truck.

FIG. 5 is a schematic detail of the receivers with a double ramp and hinge posts in the side of an opening at the rear of a pickup truck box.

FIG. 6 is a plan view schematic detail of the double ramp receiver.

FIG. 7 is a schematic detail of a headed post hinge in plan view.

FIG. 8 is a schematic detail of an extensible latching pin.

FIGS. 9, 10 and 11 are sequential schematic detail of engagement of a clap and post.

FIG. 12 schematically shows a tailgate having cables and operator levels which selectively open the tailgate inward and outward.

FIG. 13 shows a tailgate operating lever and a solenoid switch for selectively controlling inward or outward hinging of the tailgate.

DETAILED DESCRIPTION OF THE PREFERRED EMBODIMENTS

Referring to the drawings, a pickup truck box is generally indicated by the numeral 1. The truck box has sides 3 and a bed 5. Inward facing rearward end portion 7 of the sides 3 define an opening 9. A tailgate 11 fits within the opening. The tailgate has an outer surface 13 and upper edge 15, a lower edge 17 and side edges 19. Latching pins 21 are spring mounted to extend outward from upper portions of side edges 19 near the upper edge 15 to fit into receivers 23. When the tailgate is laid in its inner position, the spring mounted latch pins 21 engage receivers 25 in the side walls near the bed 5 of the truck box 1. A first set of hinge pins 27 in the truck box is engaged by hinge clasps 29 when the tailgate is in the vertical position and when the tailgate is released for rotating outwardly. A second set of hinge pins 31 slightly above the first set 27 engages the hinge clasps 33 when the tailgate is in the vertical position and when the tailgate is rotated inwardly flush with the truck bed 9.

FIG. 2 shows an outward extended position of the tailgate 11 in which hinge clasps 29 capture hinge pins 27.

FIG. 3 shows the inward laid position of the tailgate 11 when the hinge clasps 33 grasp the hinge pins 31 and hinge clasps 29 are released from hinge pins 27 as the tailgate 11 is laid inward on the truck bed with extensible pins 21 in the auxiliary forward receivers 25.

FIG. 4 is a schematic side elevation of a tailgate 11 having a spoiler 35 mounted on the outer surface 13 of the tailgate. The spoiler 35 has a curved sloping forward or upper portion 37 and a flat vertical or lower portion 39. The truck bed 5 has a vertical surface 41 which forms a hard travel stop point for the surface 39 of the spoiler when the tailgate is rotated outwardly after engaging the first hinges, or generally 180° from the position shown. In the outward position, the tailgate extends outward of the bumper 43. In the inner position in which the tailgate 11 is flush with the bed 5, the entire tailgate is within the protection of the bumper.

FIG. 5 generally shows the truck box 1 and the top rail 45 and the double wrap stripe 47 which surrounds the receiver 23, so that the spring mounted latch pin is pushed inward in the tailgate by the double wrap stripe 47 when the tailgate is either moved rearward or forward into the vertical position.

Hinge pin 27 is shown connected to the side of the truck body slightly below the level of the bed 5. Hinge pin 31 is shown mounted on the rear portion 7 of the side 3 slightly above the hinge pin 27.

As shown in FIG. 5, hinge pin 27 is mounted in a recess 49 which receives the clasp for the hinge pin. Hinge pin 31 is mounted in a curved recess 51 in which the clasp may slide.

FIG. 6 shows a schematic plan view of the double wrap stripe 47, which raises the latch pin as the tailgate is closed so that the latch pin may project into the receiver 23.

FIG. 7 shows a plan view of the latch pin 31, which is similar to the latch pin 27 and which is mounted on the end portion 7 of the side wall 3.

FIG. 8 shows the upper edge 15 of tailgate 11 in which a spring 53 in a recess urges the latch pin 21 outward. A cable 55 retracts the latch pin. Cable 45 may be replaced by a solenoid or a linkage.

FIGS. 9, 10 and 11 show schematically the engagement of a hinge pin 31 by a clasp 33. The clasp 33 moves onto the hinge pin 31, as shown in FIG. 10, and thereafter the clasp 33 captures the hinge pin 31 for a hinging action by closing the opening 57 in the clasp.

FIG. 12 schematically shows a tailgate 11 and the handles 61 and 63, with the recess 65 for placing fingers under the handles and lifting either of the handles to operate the tailgate 11. Raising handle 61 in the direction shown by arrow 67 pulls cable 55 and draws latch pin 21 inward, compressing spring 53. Pulling handle 63 outward in the direction shown by arrow 69 pulls cable 71, which operates around pulleys 73 and 75 to pull the latch pin 21 against the spring pressure 53 for releasing the tailgate. Similar cables extend from the other side of the handles to operate elements on the other edge of the tailgate. Rotating handle 61 upward in the direction of arrow 67 also pulls cable 77, which extends around pulley 79 and pulleys 81 and 83, to raise the clasp pin 85 against the force of spring 87 in clasp 29 for releasing hinge pin 27 and allowing the gate to swing inward to its stowed position on the bed around the hinge pin in clasp 33. Pulling handle 63 outward in a rotational direction of arrow 69 pulls cable 91, which extends around pulleys 93, 95 and 97, to raise the latch pin 99 against the force of spring 87 to allow the gate to rotate outward.

The clasp pins 85 and 99 may be operated by solenoids controlled by the position of slide switch 101 shown in FIG. 13. When the slide is in the right hand position, as shown in FIG. 13, lifting handle 103 in the direction of arrow 105 pulls a cable 55 to release the latch pins 21. The slide switch in the right hand position, as shown in FIG. 13, operates a solenoid to raise the clasp pins 85 so that the tailgate may rotate inward into its stowed position around the pins 31 in clasps 33. When the slide switch is moved to the left hand position 107, the lifting of handle 103 energizes solenoids to lift clasp pins 99 on opposite sides of the tailgate, allowing the tailgate to be rotated outward.

The appropriate solenoids may be energized when the latch 101 is moved, or the energization circuits may be set up by movement of the slide 101 for energizing of the circuits when the handle 103 is raised.

While the invention has been described with reference to specific embodiments, modifications and variations of the invention may be constructed without departing from the scope of the invention, which is defined in the following claims.

I claim:

1. A tailgate assembly apparatus, comprising a tailgate mount connected to a truck and a tailgate connected to the tailgate mount, the tailgate having a pair of latches mounted on the tailgate near an upper edge and mounted on the mount near the upper edge, a first pair of disconnectable hinges mounted on the tailgate near a lower edge and mounted on the mount near a lower end of the mount, a second pair of disconnectable hinges mounted on the tailgate above the first pair of hinges and mounted on the mount above the first pair of hinges and near a bed of the truck, means for unlatching the first pair of latches and disengaging the first pair of hinges and rotating the tailgate inward in the mount against a bed of the truck, and for unlatching the pair of latches and disengaging the second pair of hinges and rotating the tailgate outward.

2. Tailgate apparatus on a pickup truck, comprising in combination: a bed having side walls and a floor connected to the side walls, the floor and the side walls forming an opening at a rear end thereof for receiving a tailgate, a receiver at a top rear end of each sidewall, first hinges at a bottom rear end of each sidewall near the floor and second hinges connected to each sidewall above the first hinges and near the floor, a tailgate having inner and outer surfaces and a top edge, a bottom edge and side edges for positioning in the opening, latch pins extensible from the tailgate sides near the top edge for engaging the receivers, a first pair of clasps extending from the side of the tailgate near the lower edge for selectively engaging and disengaging the first hinges, a second set of clasps positioned on the sides of the tailgate above the first set for selectively engaging and disengaging the second hinges, and a second receiver in each sidewall above the floor for receiving the latch pins.

3. The apparatus of claim 2, further comprising a spoiler extending outward from the outer surface of the tailgate.

4. The apparatus of claim 3, further comprising a step in the body of the pickup truck below the opening for abutting the spoiler when the first set of clasps engage the first hinges and when the tailgate is lowered rearwardly.

* * * * *